Oct. 29, 1935.    M. ALEX    2,019,034
WATER COOLER AND DISPENSER
Filed Feb. 17, 1934    2 Sheets—Sheet 1

INVENTOR
MAX ALEX
BY
ATTORNEY

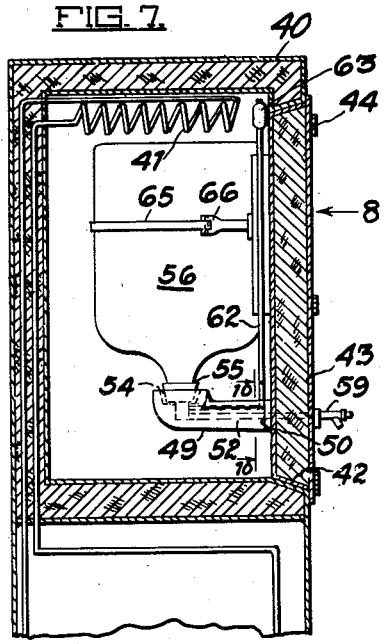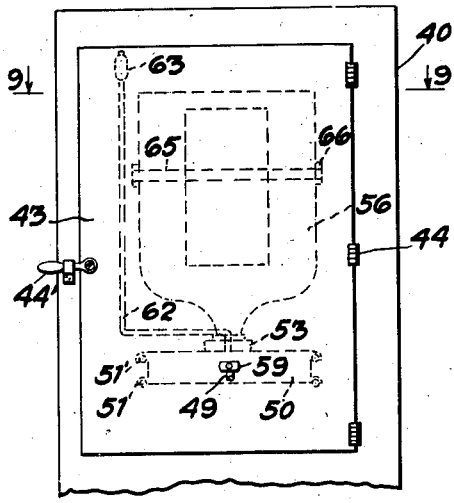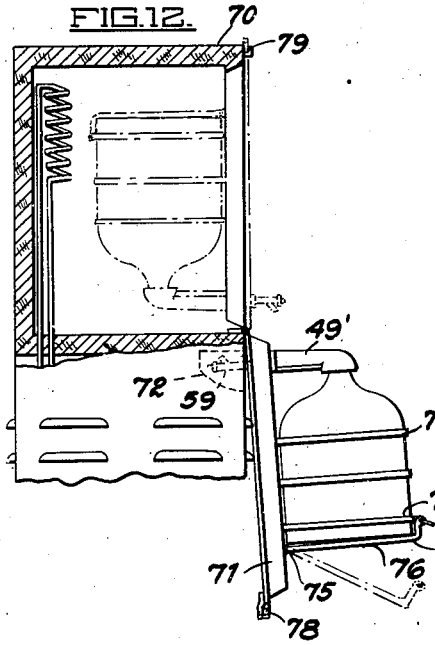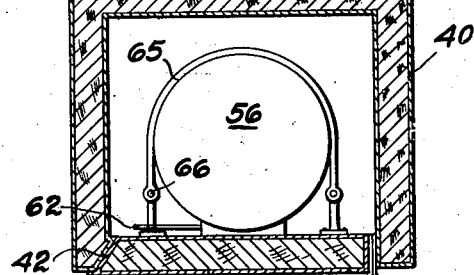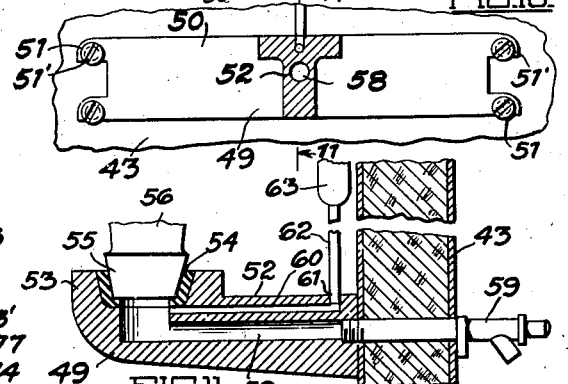

Patented Oct. 29, 1935

2,019,034

UNITED STATES PATENT OFFICE 2,019,034

WATER COOLER AND DISPENSER

Max Alex, Los Angeles, Calif.

Application February 17, 1934, Serial No. 711,805

4 Claims. (Cl. 62—141)

This invention has to do in a general way with the art of cooling and dispensing beverages, and is more particularly related to means for cooling and dispensing bottled water.

It is well known that the chief value of bottled water resides in its purity, and extreme care is used in thoroughly sterilizing the bottles and delivering the water into them in a manner such that the possibility of contamination is entirely eliminated or is reduced to a minimum. In dispensing water for consumption, however, it is conventional practice to employ a cooler of some kind in which the bottle is mounted in inverted position in a secondary container. This secondary container may be an olla, or it may be another suitable vessel contained in or surrounded by a cooling chamber.

Although extreme care is taken in the bottling of the water, the secondary container, which is in the possession of the consumer, is seldom inspected or treated to insure its sterility. In other words, this secondary container always contains some water. A certain amount of air, which may be contaminated with dust, smoke, and the like, is drawn into the secondary container each time water is withdrawn therefrom, and it has been found that even though the water in the bottle has a zero bacteria count, the water withdrawn from a cooler of this character may have a very high bacteria count, due to contamination within the secondary container. It therefore becomes a primary object of this invention to produce a cooler and dispenser of the class described in which the water is withdrawn directly from the bottle instead of being dispensed through a secondary reservoir as is the conventional practice.

It is necessary, in a dispenser of this character in which the contents of the bottle are withdrawn by maintaining the bottle in an inverted position, to have means of some kind for admitting air to the bottle in order to balance the pressure in the bottle with the atmosphere. Since it is a primary object to avoid contamination of the water by admitting contaminated air thereto, I employ means for filtering the air prior to its admission to the bottle in the manner just referred to.

The general construction of the device contemplated by this invention, comprises an insulated box equipped with suitable refrigerating means, and having an opening in one side through which the bottle may be inserted into the box.

The box contains means for supporting the bottle in an inverted position, and, in order to facilitate the removal and replacement of bottles, such supporting means are constructed so that they may be moved partially or entirely into and out of the box through the opening.

Conduit means are provided for delivering the liquid directly from the bottle to a suitable valved outlet connection.

It is a feature of the invention that the conduit means are easily removable so that they may be sterilized from time to time.

In one preferred form of the invention, the conduit means are of compact and of light construction so that the salesman delivering the water to the consumer may install a new, freshly sterilized conduit with each fresh bottle of water.

The details in the construction of certain preferred forms of my invention, together with other objects attending its production, will be best understood from the following description of the accompanying drawings which are chosen for illustrative purposes only, and in which—

Fig. 7 is a sectional elevation showing the cooling chamber and bottle-supporting arrangement of a modified form of my invention;

Fig. 8 is a front elevation taken in the direction of the arrow 8 in Fig. 7;

Fig. 9 is a plan section taken in a plane represented by the line 9—9 of Fig. 8;

Fig. 10 is a fragmentary enlarged elevation taken on the line 10—10 of Fig. 7;

Fig. 11 is a sectional elevation showing a modified form of bottle support and outlet conduit means which may be considered as having been taken in a plane represented by the line 11—11 of Fig. 10; and Fig. 12 is an elevational view of another modified form of my invention.

Figure 1:
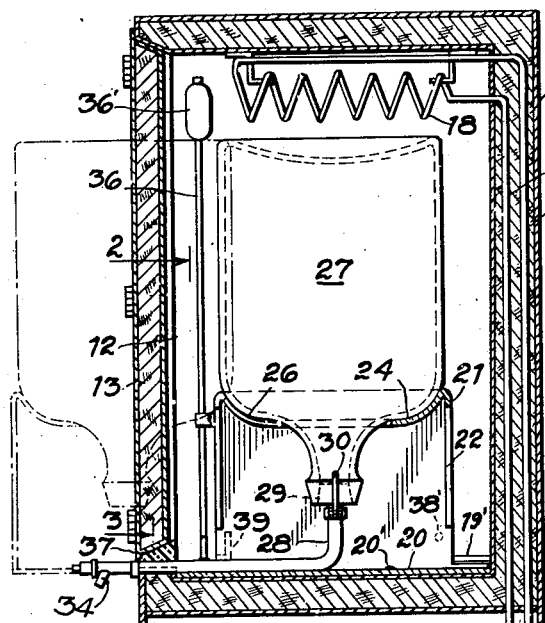
Fig. 1 is an elevational view with parts broken away showing a preferred form of my invention.
Figure 3:
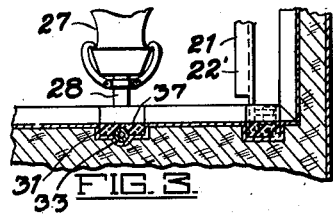
Fig. 3 is a fragmentary section taken on the line 3—3 of Fig. 1.
Figure 2:
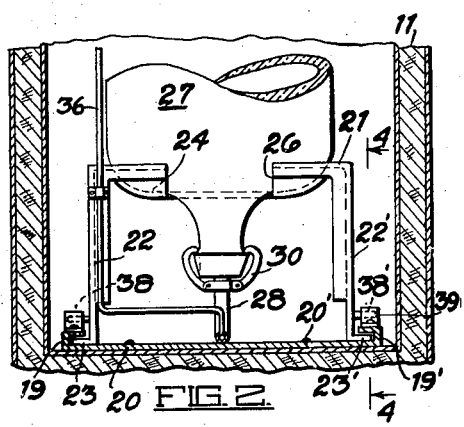
Fig. 2 is a fragmentary sectional elevation taken on the line 2—2 of Fig. 1.
Figure 5:
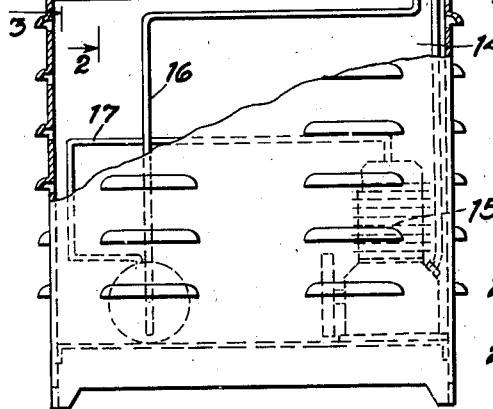
Fig. 5 is a plan view showing one form of bottle support adapted for use in connection with the device shown in Fig. 1.
Figure 5:
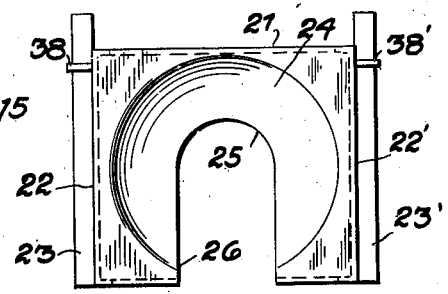
Figure 4:
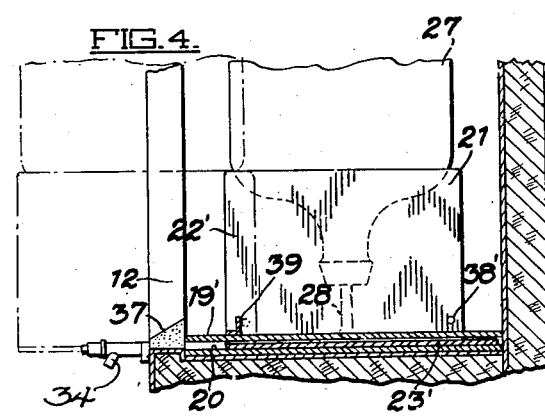
Fig. 4 is a fragmentary section taken in the plane represented by the line 4—4 of Fig. 2.
Figure 6:
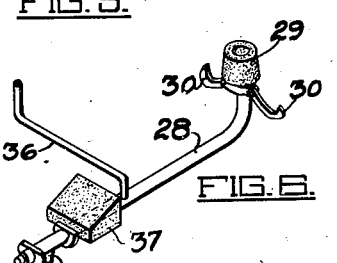
Fig. 6 is a detached perspective view showing one form of outlet conduit adapted for use in the device shown in Fig. 1.

More particularly describing the invention as herein illustrated, reference numeral 11 indicates an insulated box provided with an opening 12 in one side which is adapted to be closed by an insulated door or closure 13.

The box 11 is shown as being mounted on top of or otherwise associated with a compartment 14 which contains a refrigerating unit generally indicated by reference numeral 15 which communicates through pipes 16 and 17 with a coil 18 shown as being mounted in the top of the box 11.

Although I have shown the refrigerating unit 15 as being of the compresser type, it is to be understood that various other types of units may be employed such as the absorption unit shown and described in my Patent Number 1,955,724.

Mounted on the bottom or floor of the box 11, I provide a pair of ways 19 and 19' which are shown as being formed on the edges of a base plate 20 which is secured to the bottom of the box by means of screws or other suitable means indicated by reference numeral 20'.

Reference numeral 21 indicates what I may term a bottle support or carriage which in the form shown is stamped from a single piece of metal having side members 22 and 22', such members being provided at their lower edges with flanges 23 and 23' which are slidably received in the ways 19 and 19'.

The side members 22 and 22' carry what I may term a concave top member 24, such member having an opening 25 in its bottom which communicates with a notch or slot 26 extending through the front of the top member. The concave top of the carriage 21 is adapted to support an inverted bottle 27, the neck of which passes downwardly through the opening 25 in the top.

This particular form of my invention contemplates the use of a discharge conduit which is of simple compact construction so that the conduit may be sterilized or changed for a sterilized conduit each time a new bottle is installed. This conduit is indicated by reference numeral 28 where it is shown as comprising a pipe having a vertical leg mounted in a stopper 29 which is received in the mouth of the bottle, the conduit being held in place by suitable spring clips 30. In addition to the vertical leg or section just referred to the conduit 28 embodies a horizontal section which is of a length such that it extends exteriorly of the box. In this particular form, the lower edge of the opening 12 is provided with a notch 31, the bottom of which is recessed as indicated at 32 to support the horizontal portion of the conduit 28.

For the purpose of closing this notch and maintaining the insulated condition in the box, I provide a rubber or other suitable packing block 37 which fits in the notch and covers the conduit, the upper surface of such block being shaped so as to conform with the surface of the lower edge of the opening.

Reference numeral 34 indicates a suitable valved outlet spigot which is mounted on the outer end of the conduit 28.

For the purpose of admitting air to the bottle for balancing the pressure therein with the atmosphere, I show the conduit 28 as being provided with an air inlet pipe 36 which extends a substantial distance above the upper end of the inverted bottle, and, in order to assure a clean supply of air into the bottle, I provide this conduit with an air filter 36' which may be filled with activated charcoal, silica gel or other suitable absorbent medium.

Since the bottle support is slidably mounted within the box, the bottle may be removed and replaced by simply pulling the support forward, the shoes or flanges 23 and 23' engaging the ways 19 and 19' to prevent the weight of the bottle tipping the bottle support when the unit is drawn forward.

In order that the unit may not be pulled all the way out of the box, I provide stop pins 38 and 38' on the side members of the carriage, such pins being adapted for engagement with angles 39 mounted on the upper flange of the guide ways 19 and 19'.

In Figs. 7 to 11 inclusive, I show a modified form of my invention in which the bottle, instead of being mounted on a separate carriage, is supported directly upon the door or closure for the box. In this form of my invention, the insulated box is indicated by reference numeral 40 which is shown as having a cooling coil 41 connected with a source of refrigerant (not shown) and an opening 42 through which a door or closure 43 is hinged along one side of the opening as indicated at 44. A suitable latch 44' is provided for the purpose of maintaining the door closed.

Reference numeral 49 indicates what I may term a bracket which as shown in Fig. 10 comprises a main supporting plate 50 having notched ears 51 on its ends whereby the plate and bracket are removably supported on the inner surface of the door through the medium of screws 51'. The bracket 49, in addition to the plate 50, comprises a rearwardly extending plate or section 52 which terminates in, what I may term, a cup 53, such cup being provided with a packing ring 54 which receives the mouth portion 55 of a bottle 56. The section 52 is provided with a conduit passage 58 which communicates directly with the mouth of the bottle and is connected at the end adjacent the door with an outlet spigot 59. It will be seen, therefore, that in this form of my invention the bracket not only constitutes the support for the bottle but it also contains the outlet passage through which the contents of the bottle are discharged.

For the purpose of admitting air to the bottle, I provide a secondary air passage 60 which is shown as being formed in the section 52, such passage being connected as indicated at 61 with a vertical air pipe 62 which extends to a point above the liquid level in the bottle where it is provided with an air filter 63.

Reference numeral 65 indicates a strap or band which engages the bottle to prevent its tipping in the cup 53, such band being secured to the door through any suitable fastening means such as the pin and clevis connection generally indicated at 66.

In the form of my invention shown in Fig. 12, I show a box 70 which is provided with a door 71 hinged on the lower horizontal side of the box opening. This door is provided with a bracket 49' which is the same as the bracket 49 described in connection with Fig. 7, and the support for the box is shown as having a recess 72 to receive the outlet spigot 59 when the door is swung downwardly to the position shown in Fig. 12. In this device, the door is provided with a rigid band or a series of such bands, indicated at 73, uppermost band 73' being associated with a pivoted strap 74. This strap is hinged to the upper edge of the door as indicated at 75 and is provided with an apertured hook 76 which fits over the bottom of the bottle when it is first installed, and is secured to the band 73' by means of a suitable pin 77.

In placing the bottle in a device of this character, the pivoted strap 74 is released and dropped down to the broken line position shown in Fig. 12, after which the bottle is lifted into the space enclosed by the band 73 to a point at which its mouth fits into the packing in the supporting bracket 49'. The strap 76 is then swung into the full line position shown and is locked into position by means of a pin or other suitable means. The door can then be easily closed and locked in place by a suitable latch shown as comprising a drop bar 78 in a keeper 79.

It is to be understood that, while I have herein described and illustrated certain preferred forms of my invention, the invention is not limited to the precise construction as herein described, but includes within its scope whatever changes fairly come within the spirit of the appended claims.

I claim as my invention:

1. The combination of: a bottle; an insulated box having an opening in one side thereof; a door hinged to one side of said opening; a bracket mounted on the inner surface of said door; a cup on said bracket for engaging and supporting the mouth of said bottle in inverted position, said bracket having a conduit passage communicating with said cup; a valved outlet connection mounted in said door and communicating with said cup; and refrigerating means in said box.

2. The combination of: a bottle; an insulated box having an opening in one side thereof; a door hinged to one side of said opening; a bracket mounted on the inner surface of said door; a cup on said bracket for engaging and supporting the mouth of said bottle in inverted position, said bracket having a conduit passage communicating with said cup; a valved outlet connection mounted in said door and communicating with said cup; an air inlet conduit communicating with said cup; filter means in said air inlet conduit; and refrigerating means in said box.

3. The combination of: a bottle; an insulated box having an opening in one side thereof; a door hinged to said opening; a bracket mounted on said door, said bracket being provided with means for engaging and supporting the mouth of said bottle in inverted position and having a conduit passage communicating directly with the mouth of said container; a discharge fitting mounted in said door and communicating with said conduit passage; and refrigerating means in said box.

4. The combination of: a bottle; an insulated box having an opening in one side thereof; a door hinged to the bottom of said opening; a bracket mounted on said door, said bracket being provided with means for engaging and supporting the mouth of said bottle in inverted position and having a conduit passage communicating directly with the mouth of said container; a discharge fitting mounted in said door and communicating with said conduit passage; and refrigerating means in said box.

MAX ALEX.